United States Patent
Asano et al.

(10) Patent No.: US 11,498,850 B2
(45) Date of Patent: *Nov. 15, 2022

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Yusuke Nishio, Osaka (JP); Masashi Sakaida, Hyogo (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

This patent is subject to a terminal disclaimer.

(21) Appl. No.: 16/912,039

(22) Filed: Jun. 25, 2020

(65) Prior Publication Data
US 2020/0328462 A1 Oct. 15, 2020

Related U.S. Application Data

(63) Continuation of application No. PCT/JP2018/046260, filed on Dec. 17, 2018.

(30) Foreign Application Priority Data

Jan. 5, 2018 (JP) .............................. JP2018-000427

(51) Int. Cl.
| | | |
|---|---|---|
| *H01M 10/0562* | (2010.01) | |
| *H01M 10/0525* | (2010.01) | |
| *C01F 17/36* | (2020.01) | |

(52) U.S. Cl.
CPC .......... *C01F 17/36* (2020.01); *H01M 10/0525* (2013.01); *H01M 10/0562* (2013.01); *H01M 2300/008* (2013.01)

(58) Field of Classification Search
None
See application file for complete search history.

(56) References Cited

U.S. PATENT DOCUMENTS

| | | |
|---|---|---|
| 4,352,869 A | 10/1982 | Mellors |
| 5,506,073 A | 4/1996 | Angell et al. |
| (Continued) | | |

FOREIGN PATENT DOCUMENTS

| | | |
|---|---|---|
| CN | 105254184 A | 1/2016 |
| CN | 105680048 A | 6/2016 |
| (Continued) | | |

OTHER PUBLICATIONS

Indian Examination Report dated Mar. 28, 2022 for the related Indian Patent Application No. 202047027797.

(Continued)

*Primary Examiner* — Christopher P Domone
(74) *Attorney, Agent, or Firm* — McDermott Will & Emery LLP

(57) ABSTRACT

A solid electrolyte material contains Li; Y; at least one selected from the group consisting of Mg, Ca, Sr, Ba, Zn, Zr, Nb, and Ta; and at least one selected from the group consisting of Cl, Br, and I. An X-ray diffraction pattern of the solid electrolyte material obtained using Cu—Kα radiation as an X-ray source includes peaks in a range of diffraction angles 2θ of 30° or more and 33° or less, in a range of diffraction angles 2θ of 39° or more and 43° or less, and in a range of diffraction angles 2θ of 47° or more and 51° or less.

8 Claims, 6 Drawing Sheets

(56) References Cited

U.S. PATENT DOCUMENTS

| | | | |
|---|---|---|---|
| 5,714,279 | A | 2/1998 | Zajac, Jr. et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1* | 8/2017 | Furukawa ........... H01M 4/0414 |
| 2017/0288281 | A1 | 10/2017 | Chiang et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350615 | A1 | 11/2020 | Sakaida et al. |
| 2020/0350622 | A1 | 11/2020 | Sakaida et al. |

FOREIGN PATENT DOCUMENTS

| | | | |
|---|---|---|---|
| CN | 108701860 | A | 10/2018 |
| EP | 2916381 | B1 | 6/2016 |
| EP | 3428929 | A1 | 1/2019 |
| EP | 3496202 | A1 | 6/2019 |
| EP | 3736831 | A1 | 11/2020 |
| EP | 3736834 | A1 | 11/2020 |
| EP | 3736899 | A1 | 11/2020 |
| EP | 3745422 | A1 | 12/2020 |
| EP | 3745518 | A1 | 12/2020 |
| IN | 201847045950 | A | 2/2019 |
| JP | S57-132677 | A | 8/1982 |
| JP | H05-306117 | A | 11/1993 |
| JP | H08-171938 | A | 7/1996 |
| JP | H09-293516 | A | 11/1997 |
| JP | 11-238528 | A | 8/1999 |
| JP | 2001-052733 | A | 2/2001 |
| JP | 2004-235155 | A | 8/2004 |
| JP | 2006-244734 | A | 9/2006 |
| JP | 2008-021556 | A | 1/2008 |
| JP | 2011-129312 | | 6/2011 |
| JP | 5076134 | B2 | 11/2012 |
| JP | 2012-246196 | A | 12/2012 |
| JP | 2013-073791 | A | 4/2013 |
| JP | 2015-011901 | A | 1/2015 |
| JP | 2015-032529 | A | 2/2015 |
| JP | 2015-056349 | A | 3/2015 |
| JP | 2016-024874 | A | 2/2016 |
| JP | 2016-171067 | A | 9/2016 |
| JP | 2017-059342 | A | 3/2017 |
| JP | 2017-091953 | A | 5/2017 |
| JP | 2017-091955 | A | 5/2017 |
| JP | 2017-117753 | A | 6/2017 |
| JP | 2017-518622 | A | 7/2017 |
| JP | 2017-152324 | A | 8/2017 |
| JP | 6222134 | B2 | 11/2017 |
| JP | 2017-224474 | A | 12/2017 |
| WO | 2011/073798 | A2 | 6/2011 |
| WO | 2015/011937 | A1 | 1/2015 |
| WO | 2015/030052 | A1 | 3/2015 |
| WO | 2015/049986 | A1 | 4/2015 |
| WO | 2017/108105 | A1 | 6/2017 |
| WO | 2017/154766 | A1 | 9/2017 |
| WO | 2017/154922 | A1 | 9/2017 |
| WO | 2018/025582 | A1 | 2/2018 |
| WO | 2019/146218 | A1 | 8/2019 |
| WO | 2019/146219 | A1 | 8/2019 |

OTHER PUBLICATIONS

Indian Examination Report dated Apr. 4, 2022 for the related Indian Patent Application No. 202047027476.

English Translation of Chinese Search Report dated Jul. 6, 2021 for the related Chinese Patent Application No. 201880071236.0.

English Translation of Chinese Search Report dated Jul. 30, 2021 for the related Chinese Patent Application No. 201880071076.X.

English Translation of Chinese Search Report dated Aug. 2, 2021 for the related Chinese Patent Application No. 201880070620.9.

International Search Report of International Application No. PCT/JP2018/043363 dated Feb. 19, 2019.

International Search Report of International Application No. PCT/JP2018/041893 dated Feb. 19, 2019.

International Search Report of International Application No. PCT/JP2018/041892 dated Feb. 19, 2019.

International Search Report of International Application No. PCT/JP2018/041894 dated Feb. 19, 2019.

International Search Report of International Application No. PCT/JP2018/046258 dated Feb. 5, 2019.

International Search Report of International Application No. PCT/JP2018/046259 dated Mar. 12, 2019.

International Search Report of International Application No. PCT/JP2018/046262 dated Mar. 19, 2019.

International Search Report of International Application No. PCT/JP2018/041900 dated Feb. 19, 2019.

International Search Report of International Application No. PCT/JP2018/041897 dated Feb. 19, 2019.

International Search Report of International Application No. PCT/JP2018/046263 dated Mar. 19, 2019.

International Search Report of International Application No. PCT/JP2018/046264 dated Mar. 19, 2019.

International Search Report of International Application No. PCT/JP2018/042061 dated Feb. 19, 2019.

International Search Report of International Application No. PCT/JP2018/042062 dated Feb. 19, 2019.

Yasumasa Tomita et al., "Lithium ion conductivity of Li3InBr6 doped with different element", Denka Chemical Society 70th Anniversary Conference Abstracts, Mar. 25, 2003, p. 384; with English translation.

Yasumasa Tomita et al., "Preparation of Substituted Compounds of Lithium Indium Bromide and Fabrication of All Solid-State battery", Recent Innovations in Chemical Engineering, 2017, 10, 12-17.

The Extended European Search Report dated Jan. 29, 2021 for the related European Patent Application No. 18898666.5.

The Extended European Search Report dated Feb. 5, 2021 for the related European Patent Application No. 18898795.2.

The Extended European Search Report dated Feb. 9, 2021 for the related European Patent Application No. 18898242.5.

The Extended European Search Report dated Feb. 9, 2021 for the related European Patent Application No. 18898043.7.

The Extended European Search Report dated Feb. 9, 2021 for the related European Patent Application No. 18898663.2.

The Extended European Search Report dated Feb. 9, 2021 for the related European Patent Application No. 18898873.7.

(56) References Cited

OTHER PUBLICATIONS

The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of PCT application No. PCT/JP2018/046260 dated Mar. 12, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc) Synthesis, Crystal Structures, and Ionic Motion", Journal of Inorganic and General Chemistry, Jul. 1997, vol. 623/Issue 7, pp. 1067-1073.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H.-J., and H. D. Lutz, "Neue schnelle Ionenleiter vom Typ MI3 MIIICl6 (MI = Li, Na, Ag; MIII= In, Y)." Zeitschrift fur anorganhische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M = Zn, Co, Fe) by Nano-grinding and their Ionic Conductivity." Transactions of the Materials Research Society of Japan 33.4 (2008): 973-976 (Year: 2008).
G.J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.

\* cited by examiner

SOLID ELECTROLYTE MATERIAL AND BATTERY

BACKGROUND

1. Technical Field

The present disclosure relates to a solid electrolyte material and a battery.

2. Description of the Related Art

Japanese Unexamined Patent Application Publication No. 2011-129312 discloses an all-solid battery using a sulfide solid electrolyte.

Z. Anorg. Allg. Chem. 623 (1997), 1067-1073. (Non Patent Literature 1) discloses $Li_3YCl_6$.

Z. Anorg. Allg. Chem. 623 (1997), 1352-1356. (Non Patent Literature 2) discloses $Li_3YBr_6$.

SUMMARY

In one general aspect, the techniques disclosed here feature a solid electrolyte material containing Li; Y; at least one selected from the group consisting of Mg, Ca, Sr, Ba, Zn, Zr, Nb, and Ta; and at least one selected from the group consisting of Cl, Br, and I. An X-ray diffraction pattern of the solid electrolyte material obtained using Cu—Kα radiation as an X-ray source includes peaks in a range of diffraction angles 2θ of 30° or more and 33° or less, in a range of diffraction angles 2θ of 39° or more and 43° or less, and in a range of diffraction angles 2θ of 47° or more and 51° or less.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
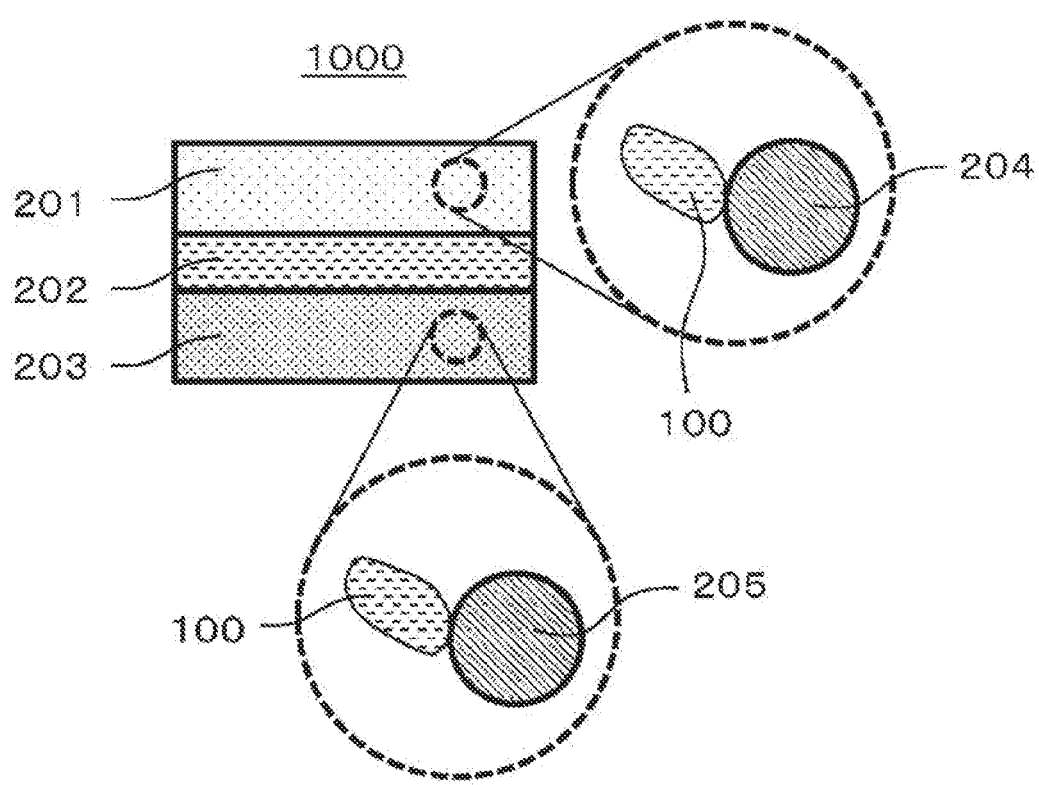
FIG. 1 is a sectional view illustrating the schematic configuration of a battery according to Embodiment 3.

Hereinafter, embodiments according to the present disclosure will be described with reference to drawings.

Embodiment 1

A solid electrolyte material according to Embodiment 1 is a material composed of Li, Y, M, and X.

M is at least one selected from the group consisting of Mg, Ca, Sr, Ba, Zn, Zr, Nb, and Ta.

X is at least one selected from the group consisting of Cl, Br, and I.

An X-ray diffraction pattern of the solid electrolyte material according to Embodiment 1 obtained using Cu—Kα radiation as an X-ray source includes peaks in a range of diffraction angles 2θ of 30° or more and 33° or less, in a range of diffraction angles 2θ of 39° or more and 43° or less, and in a range of diffraction angles 2θ of 47° or more and 51° or less.

These features provide a solid electrolyte material having a high lithium-ion conductivity, that is, a halide solid electrolyte material.

In addition, use of the solid electrolyte material according to Embodiment 1 having the above-described features provides an all-solid secondary battery having good charge/discharge characteristics.

In addition, use of the solid electrolyte material according to Embodiment 1 provides a sulfur-free all-solid secondary battery. In other words, the solid electrolyte material according to Embodiment 1 does not have a composition that generates hydrogen sulfide upon exposure to the air (for example, the composition of Japanese Unexamined Patent Application Publication No. 2011-129312). This provides an all-solid secondary battery that does not generate hydrogen sulfide and has high safety.

Incidentally, the X-ray diffraction pattern of the solid electrolyte material according to Embodiment 1 may further include another peak in a range of diffraction angles 2θ of 15° or more and 18° or less.

This feature provides a solid electrolyte material having a higher lithium-ion conductivity.

Incidentally, the solid electrolyte material according to Embodiment 1 may include a first crystal phase. The first crystal phase may be a crystal phase that provides the above-described characteristic diffraction pattern.

Thus, the solid electrolyte material according to Embodiment 1 may include the first crystal phase.

Incidentally, when sufficient intensities are not measured, some of the above-described peaks may not be observed.

The first crystal phase that provides the above-described characteristic diffraction pattern is not limited to a specific crystal structure, and may be, for example, the following crystal structure.

For example, anions form a sublattice structure that is a hexagonal closest packed structure or a structure in which atoms are arranged in a distorted hexagonal closest packed structure. Specifically, in the sublattice of anions, each anion is coordinated to 12 other anions. In the case of the ideal hexagonal closest packed structure, these 12 anions include a combination of 6 anions that are present in the same plane and form a regular hexagon. These 6 anions and the central element form a closest packed plane, and have the same in-plane coordinates in alternate closest packed planes. The first crystal phase may have a structure distorted from the above-described ideal hexagonal closest packed structure. For example, in the closest packed plane, any three anions may form angles of about 60°±5° therebetween.

Examples of such a structure include a $Li_3ErCl_6$ (hereafter, also referred to as LEC) structure having a crystal structure belonging to the space group P-3m1 and a $Li_3YbCl_6$ (hereafter, also referred to as LYC) structure having a crystal structure belonging to the space group Pnma. The detailed atomic arrangements of such structures are illustrated in Inorganic Crystal Structure Database (ICSD) (LEC structure: ICSD No. 50151, LYC structure: ICSD No. 50152).

Incidentally, the solid electrolyte material according to Embodiment 1 may include a different crystal phase having a crystal structure different from that of the first crystal phase.

The above-described feature provides a solid electrolyte material having a higher lithium-ion conductivity. Specifically, the crystal structure of the first crystal phase inferentially causes anions to be more strongly attracted toward Y or M, and mixing of M and Y inferentially provides regions in which the potential of Li ions becomes unstable. Thus, paths through which lithium ions diffuse are formed. In addition, the composition has some missing of Li to provide unoccupied sites, which facilitate conduction of lithium ions. This inferentially results in a higher lithium-ion conductivity.

The shape of the solid electrolyte material according to Embodiment 1 is not particularly limited, and may be, for example, an acicular shape, a spherical shape, or an elliptical spherical shape. For example, the solid electrolyte material according to Embodiment 1 may be particles. A plurality of particles may be stacked and then pressed so as to have a pellet shape or a plate shape.

For example, when the solid electrolyte material according to Embodiment 1 has a particulate shape (for example, a spherical shape), it may have a median diameter of 0.1 µm or more and 100 µm or less.

In Embodiment 1, the median diameter may be 0.5 µm or more and 10 µm or less.

This feature provides a higher ion conductivity and formation of a better diffusion state of the solid electrolyte material according to Embodiment 1 and, for example, an active material.

In Embodiment 1, the solid electrolyte material may have a smaller median diameter than the active material.

This feature provides formation of a better diffusion state of the solid electrolyte material according to Embodiment 1 and, for example, the active material.

Embodiment 2

Hereinafter, Embodiment 2 will be described. Some descriptions having been described in Embodiment 1 above may not be repeated.

A solid electrolyte material according to Embodiment 2 is a material composed of Li, Y, M, and X.

M is at least one selected from the group consisting of Mg, Ca, Sr, Ba, Zn, Zr, Nb, and Ta.

X is at least one selected from the group consisting of Cl, Br, and I.

The X-ray diffraction pattern of the solid electrolyte material obtained using Cu—Kα radiation as the X-ray source is converted such that the horizontal axis represents, instead of diffraction angle 2θ, q, to provide a first conversion pattern including a reference peak in a range of q of 2.109 Å$^{-1}$ or more and 2.315 Å$^{-1}$ or less. $q=4\pi \sin \theta/\lambda$ where λ is the wavelength of the Cu—Kα radiation. The X-ray diffraction pattern is converted such that the horizontal axis represents, instead of diffraction angle 2θ, $q/q_0$, to provide a second conversion pattern including peaks in a range of $q/q_0$ of 1.28 or more and 1.30 or less, and in a range of $q/q_0$ of 1.51 or more and 1.54 or less. $q_0$ is a value of q corresponding to the reference peak in the first conversion pattern.

These features provide a solid electrolyte material having a high lithium-ion conductivity, that is, a halide solid electrolyte material.

In addition, use of the solid electrolyte material according to Embodiment 2 having the above-described features provides an all-solid secondary battery having good charge/discharge characteristics.

In addition, use of the solid electrolyte material according to Embodiment 2 provides a sulfur-free all-solid secondary battery. Specifically, the solid electrolyte material according to Embodiment 2 does not have a composition that generates hydrogen sulfide upon exposure to the air (for example, the composition of Japanese Unexamined Patent Application Publication No. 2011-129312). This provides an all-solid secondary battery that does not generate hydrogen sulfide and has high safety.

Incidentally, the second conversion pattern may include a peak in a range of $q/q_0$ of 0.50 or more and 0.52 or less.

This feature provides a solid electrolyte material having a higher lithium-ion conductivity.

Incidentally, the solid electrolyte material according to Embodiment 2 may include the above-described first crystal phase as in Embodiment 1.

The first crystal phase may be a crystal phase that provides the above-described characteristic conversion pattern.

Incidentally, when sufficient intensities are not measured, some of the above-described peaks may not be observed.

Incidentally, the solid electrolyte material according to Embodiment 2 may include a different crystal phase having a crystal structure different from that of the first crystal phase.

Incidentally, in the present disclosure, the phrase "range of predetermined value A of value B to value C" means "range of B≤A≤C".

Method for Producing Solid Electrolyte Material

The solid electrolyte material according to Embodiment 1 or 2 may be produced by, for example, the following method.

Binary-halide raw material powders are prepared so as to provide target constituent elements. For example, in the case of producing a solid electrolyte material including Li, Y, Sr, and Cl, LiCl, YCl$_3$, and SrCl$_2$ are prepared. At this time, the species of the raw material powders can be selected to thereby determine the composition of the anions. The raw material powders are sufficiently mixed, and then a mechanochemical milling process is performed to mix, pulverize, and react the raw material powders. Subsequently, firing may be performed in a vacuum or an inert atmosphere. Alternatively, the raw material powders may be sufficiently mixed, and then fired in a vacuum or an inert atmosphere. The firing may be performed under firing conditions of, for example, a range of 100° C. to 650° C. for 1 hour or more.

Thus, a solid electrolyte material having the above-described composition is provided.

Incidentally, in the solid material, the configuration of the crystal phase, the crystal structure, and the positions of the peaks in the X-ray diffraction pattern obtained using Cu—Kα as the ray source and conversion patterns can be determined by adjusting the raw material ratio and by adjusting the reaction process and reaction conditions of the raw material powders.

Embodiment 3

Hereinafter, Embodiment 3 will be described. Some descriptions having been described in Embodiment 1 or 2 above may not be repeated.

A battery according to Embodiment 3 is provided using the above-described solid electrolyte material according to Embodiment 1 or 2.

The battery according to Embodiment 3 includes a solid electrolyte material, a positive electrode, a negative electrode, and an electrolyte layer.

The electrolyte layer is a layer disposed between the positive electrode and the negative electrode.

At least one of the positive electrode, the electrolyte layer, and the negative electrode includes the solid electrolyte material according to Embodiment 1 or 2.

These features provide improved charge/discharge characteristics of the battery.

Hereinafter, a specific example of the battery according to Embodiment 3 will be described.

FIG. 1 is a sectional view illustrating the schematic configuration of a battery 1000 according to Embodiment 3.

The battery 1000 according to Embodiment 3 includes a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (such as a solid electrolyte material).

The negative electrode 203 includes negative electrode active material particles 205 and solid electrolyte particles 100.

The solid electrolyte particles 100 are particles composed of the solid electrolyte material according to Embodiment 1 or 2, or particles including, as a main component, the solid electrolyte material according to Embodiment 1 or 2.

The positive electrode 201 includes a material having a property of storing and releasing metal ions (such as lithium ions). The positive electrode 201 includes, for example, a positive electrode active material (such as positive electrode active material particles 204).

Examples of the positive electrode active material include lithium-containing transition metal oxides (such as Li(Ni-CoAl)O$_2$ and LiCoO$_2$), transition metal fluorides, polyanions and fluorinated polyanion materials, transition metal sulfides, transition metal oxyfluorides, transition metal oxysulfides, and transition metal oxynitrides.

The positive electrode active material particles 204 may have a median diameter of 0.1 μm or more and 100 μm or less. When the positive electrode active material particles 204 have a median diameter of less than 0.1 μm, in the positive electrode, the positive electrode active material particles 204 and the halide solid electrolyte material may not form a good diffusion state. This results in degradation of the charge/discharge characteristics of the battery. When the positive electrode active material particles 204 have a median diameter of more than 100 μm, lithium diffuses slowly in the positive electrode active material particles 204. This may make it difficult for the battery to operate at a high power.

The positive electrode active material particles 204 may have a median diameter larger than the median diameter of the halide solid electrolyte material. This results in a good diffusion state of the positive electrode active material particles 204 and the halide solid electrolyte material.

The volume ratio "v:100−v" of the positive electrode active material particles 204 and the halide solid electrolyte material included in the positive electrode 201 may satisfy 30≤v≤95. When v<30, it may be difficult to ensure a sufficient energy density of the battery. When v>95, operation at a high power may be difficult.

The positive electrode 201 may have a thickness of 10 μm or more and 500 μm or less. When the positive electrode 201 has a thickness of less than 10 μm, it may be difficult to ensure a sufficient energy density of the battery. When the positive electrode 201 has a thickness of more than 500 μm, operation at a high power may be difficult.

The electrolyte layer 202 is a layer including an electrolyte material. The electrolyte material is, for example, a solid electrolyte material. Thus, the electrolyte layer 202 may be a solid electrolyte layer.

Incidentally, the solid electrolyte layer may include, as a main component, the above-described solid electrolyte material according to Embodiment 1 or 2. Specifically, the solid electrolyte layer may include the above-described solid electrolyte material according to Embodiment 1 or 2, for example, in a weight percentage of 50% or more (50% by weight or more) relative to the whole solid electrolyte layer.

This feature provides further improved charge/discharge characteristics of the battery.

The solid electrolyte layer may include the above-described solid electrolyte material according to Embodiment 1 or 2, for example, in a weight percentage of 70% or more (70% by weight or more) relative to the whole solid electrolyte layer.

This feature provides further improved charge/discharge characteristics of the battery.

Incidentally, the solid electrolyte layer, which may include, as a main component, the above-described solid electrolyte material according to Embodiment 1 or 2, may further include, for example, inevitable impurities or starting raw materials, by-products, and decomposition products during synthesis of the above-described solid electrolyte material.

Alternatively, the solid electrolyte layer may include the solid electrolyte material according to Embodiment 1 or 2, for example, in a weight percentage of 100% (100% by weight) relative to the whole solid electrolyte layer, except for impurities due to inevitable entry.

This feature provides further improved charge/discharge characteristics of the battery.

As described above, the solid electrolyte layer may be composed only of the solid electrolyte material according to Embodiment 1 or 2.

Alternatively, the solid electrolyte layer may be composed only of a solid electrolyte material different from the solid electrolyte material according to Embodiment 1 or 2. Examples of the solid electrolyte material different from the solid electrolyte material according to Embodiment 1 or 2 include Li$_2$MgX$_4$, Li$_2$FeX$_4$, Li(Al, Ga, In)X$_4$, Li$_3$(Al, Ga, In)X$_6$, and LiI (X: F, Cl, Br, I).

The solid electrolyte layer may simultaneously include the solid electrolyte material according to Embodiment 1 or 2, and the above-described solid electrolyte material different from the solid electrolyte material according to Embodiment 1 or 2. In this case, both materials may be uniformly diffused. A layer composed of the solid electrolyte material according to Embodiment 1 or 2 and a layer composed of the above-described solid electrolyte material different from the solid electrolyte material according to Embodiment 1 or 2 may be sequentially disposed in the layer-stacking direction of the battery.

The solid electrolyte layer may have a thickness of 1 μm or more and 1000 μm or less. When the solid electrolyte layer has a thickness of less than 1 μm, the positive electrode 201 and the negative electrode 203 have a higher probability of short-circuit therebetween. When the solid electrolyte layer has a thickness of more than 1000 μm, operation at a high power may be difficult.

The negative electrode 203 includes a material having a property of storing and releasing metal ions (such as lithium ions). The negative electrode 203 includes, for example, a negative electrode active material (such as negative electrode active material particles 205).

Examples of the negative electrode active material include metal materials, carbon materials, oxides, nitrides, tin compounds, and silicon compounds. Such a metal material may be a single metal. Alternatively, the metal material may be an alloy. Examples of the metal material include metallic lithium and lithium alloys. Examples of the carbon materials include natural graphite, coke, partially graphitized carbon, carbon fiber, spherical carbon, artificial graphite, and amorphous carbon. From the viewpoint of capacity density, silicon (Si), tin (Sn), silicon compounds, and tin compounds are preferably used. In the case of using a negative electrode active material having a low average reaction voltage, the solid electrolyte material according to Embodiment 1 or 2 exerts more strongly the effect of suppressing electrolysis.

The negative electrode active material particles 205 may have a median diameter of 0.1 μm or more and 100 μm or less. When the negative electrode active material particles 205 have a median diameter of less than 0.1 μm, in the negative electrode, the negative electrode active material particles 205 and the solid electrolyte particles 100 may not form a good diffusion state. This results in degradation of the charge/discharge characteristics of the battery. When the negative electrode active material particles 205 have a median diameter of more than 100 μm, lithium diffuses slowly in the negative electrode active material particles 205. This may make it difficult for the battery to operate at a high power.

The negative electrode active material particles 205 may have a median diameter larger than the median diameter of the solid electrolyte particles 100. In this case, a good diffusion state of the negative electrode active material particles 205 and the halide solid electrolyte material is formed.

The volume ratio "v:100–v" of the negative electrode active material particles 205 and the solid electrolyte particles 100 included in the negative electrode 203 may satisfy 30≤v≤95. When v<30, it may be difficult to ensure a sufficient energy density of the battery. When v>95, operation at a high power may be difficult.

The negative electrode 203 may have a thickness of 10 μm or more and 500 μm or less. When the negative electrode has a thickness of less than 10 μm, it may be difficult to ensure a sufficient energy density of the battery. When the negative electrode has a thickness of more than 500 μm, operation at a high power may be difficult.

At least one of the positive electrode 201, the electrolyte layer 202, and the negative electrode 203 may include, for the purpose of increasing the ion conductivity or improving the chemical stability and electrochemical stability, a sulfide solid electrolyte or an oxide solid electrolyte. Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Examples of the oxide solid electrolyte include NASICON solid electrolytes represented by $LiTi_2(PO_4)_3$ and element-substitution products thereof, (LaLi)$TiO_3$-based perovskite solid electrolytes, LISICON solid electrolytes represented by $Li_{14}ZnGe_4O_{16}$, $Li_4SiO_4$, $LiGeO_4$, and element-substitution products thereof, garnet solid electrolytes represented by $Li_7La_3Zr_2O_{12}$ and element-substitution products thereof, $Li_3N$ and H-substitution products thereof, and $Li_3PO_4$ and N-substitution products thereof.

At least one of the positive electrode 201, the electrolyte layer 202, and the negative electrode 203 may include, for the purpose of increasing the ion conductivity, an organic polymer solid electrolyte. The organic polymer solid electrolyte may be, for example, a compound of a polymer and a lithium salt. The polymer may have an ethylene oxide structure. The presence of the ethylene oxide structure enables a high lithium salt content, which provides further increased ion conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, a single lithium salt selected from these may be used alone. Alternatively, as the lithium salt, a mixture of two or more lithium salts selected from these may be used.

At least one of the positive electrode 201, the electrolyte layer 202, and the negative electrode 203 may include, for the purpose of facilitating exchange of lithium ions and improving the power characteristics of the battery, a non-aqueous electrolyte solution, a gel electrolyte, or an ionic liquid.

The non-aqueous electrolyte solution includes a non-aqueous solvent and a lithium salt dissolved in the non-aqueous solvent. Examples of the non-aqueous solvent include a cyclic carbonic acid ester solvent, a chain carbonic acid ester solvent, a cyclic ether solvent, a chain ether solvent, a cyclic ester solvent, a chain ester solvent, and a fluorocarbon solvent. Examples of the cyclic carbonic acid ester solvent include ethylene carbonate, propylene carbonate, and butylene carbonate. Examples of the chain carbonic acid ester solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorocarbon solvent include fluoroethylene carbonate, methyl fluoropropionate, fluorobenzene, fluoroethyl methyl carbonate, and fluorodimethylene carbonate. As the non-aqueous solvent, a single non-aqueous solvent selected from these may be used alone. Alternatively, as the non-aqueous solvent, two or more non-aqueous solvents selected from these may be used in combination. The non-aqueous electrolyte solution may include at least one fluorocarbon solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, a single lithium salt selected from these may be used alone. Alternatively, as the lithium salt, a mixture of two or more lithium salts selected from these may be used. The concentration of the lithium salt is, for example, in the range of 0.5 to 2 mol/l.

The gel electrolyte may be a polymer material prepared so as to contain a non-aqueous electrolyte solution. Examples of the polymer material include polyethylene oxide, polyacrylonitrile, polyvinylidene fluoride, polymethyl methacrylate, and polymers having ethylene oxide bonds.

Examples of the cation constituting the ionic liquid include aliphatic chain quaternary salts such as tetraalkyl ammonium and tetraalkyl phosphonium; aliphatic cyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of the anion constituting the ionic liquid include $PF_6^-$, $BF_4^-$, $SbF_5^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain lithium salt.

At least one of the positive electrode 201, the electrolyte layer 202, and the negative electrode 203 may include, for the purpose of improving adhesion between particles, a binder. The binder is used in order to improve the binding property of the material constituting an electrode. Examples of the binder include polyvinylidene fluoride, polytetrafluoroethylene, polyethylene, polypropylene, aramid resin, polyamide, polyimide, polyamide-imide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene-butadiene rubber, and carboxymethylcellulose. The binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, two or more selected from these may be mixed and used as the binder.

At least one of the positive electrode 201 and the negative electrode 203 may include a conductive agent as needed.

The conductive agent is used in order to reduce the electrode resistance. Examples of the conductive agent include graphites such as natural graphite and artificial graphite; carbon blacks such as acetylene black and Ketjenblack; conductive fibers such as carbon fiber and metal fiber; carbon fluoride; powders of metals such as aluminum; conductive whiskers such as zinc oxide and potassium titanate; conductive metal oxides such as titanium oxide; and conductive polymers such as polyaniline, polypyrrole, and polythiophene. Use of, as the conductive agent, such a carbon conductive agent achieves a reduction in the costs.

Incidentally, the battery according to Embodiment 3 may be provided as batteries having various shapes such as a coin shape, a cylindrical shape, a prismatic shape, a sheet shape, a button shape, a flat shape, and a stacked layer shape.

EXAMPLES

Hereinafter, the present disclosure will be described in detail with reference to Examples and Comparative Examples.

Example 1

Production of Solid Electrolyte Material

In an argon atmosphere at a dew point of −60° C. or less, 409.3 mg of LiCl, 547.3 mg of $YCl_3$, and 49.4 mg of $SrCl_2$ were weighed, mixed, and then subjected to milling processing using a planetary ball mill for 12 hours at 600 rpm.

Analysis of Crystal Structure

Figure 2:
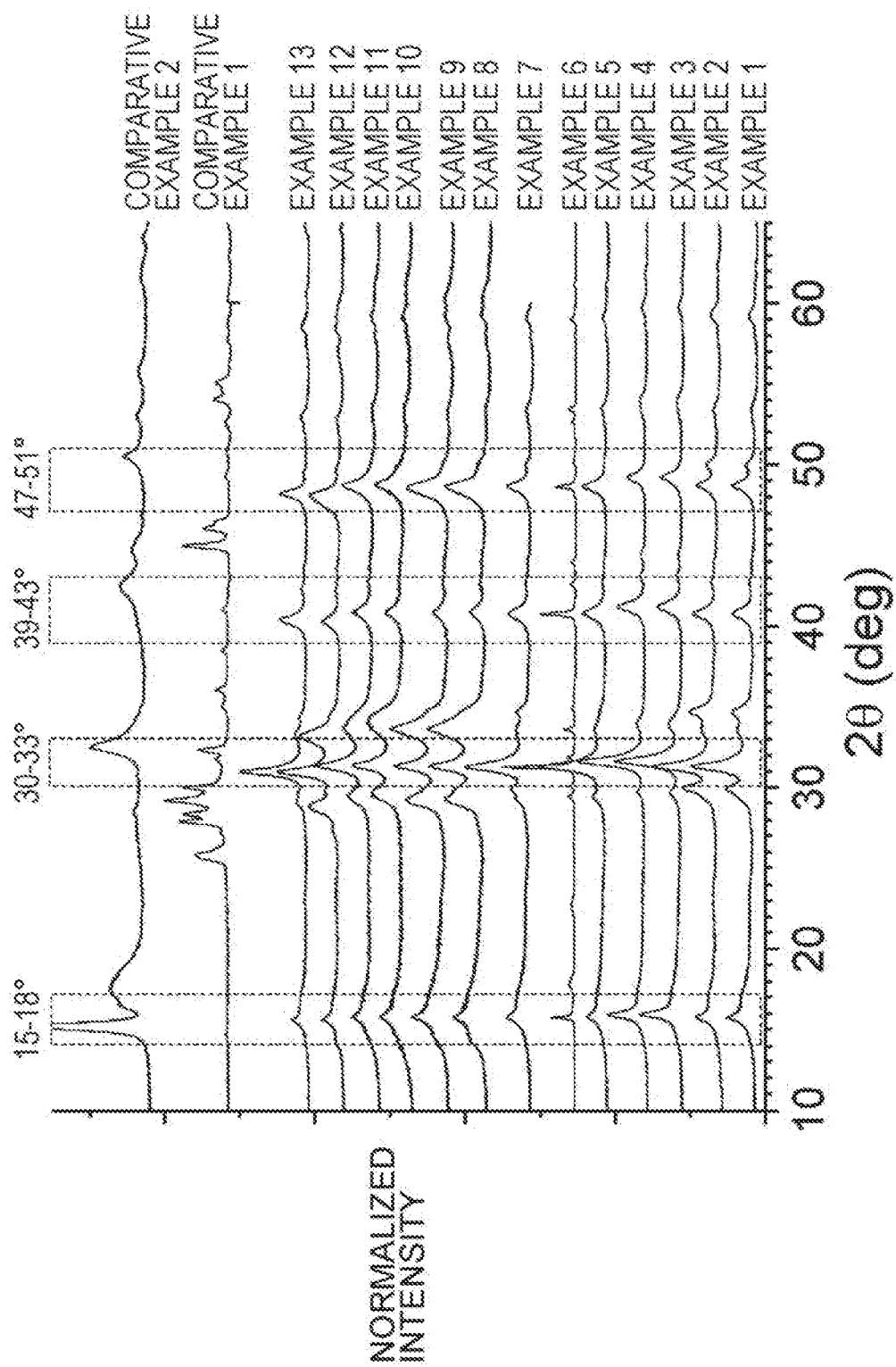
FIG. 2 illustrates peak patterns in XRD.

FIG. 2 is a graph illustrating XRD patterns.

The results in FIG. 2 were measured by the following method.

In order to analyze the crystal structure of the solid electrolyte, an X-ray diffractometer (MiniFlex 600 from Rigaku Corporation) was used to measure the X-ray diffraction pattern in a dry environment at a dew point of −45° C. or less. As the X-ray source, Cu—Kα radiation was used. Specifically, Cu—Kα radiation (wavelengths: 1.5405 Å and 1.5444 Å) was used as the X-ray, and the θ-2θ method was used to measure X-ray diffraction (XRD).

In the X-ray diffraction pattern in Example 1, peaks having relatively high intensities were observed at 15.72°, 31.34°, 40.9°, and 48.72°.

These peaks were found to substantially correspond to the positions of some of the peaks in the X-ray diffraction pattern observed from the LYC phase.

Figure 3:
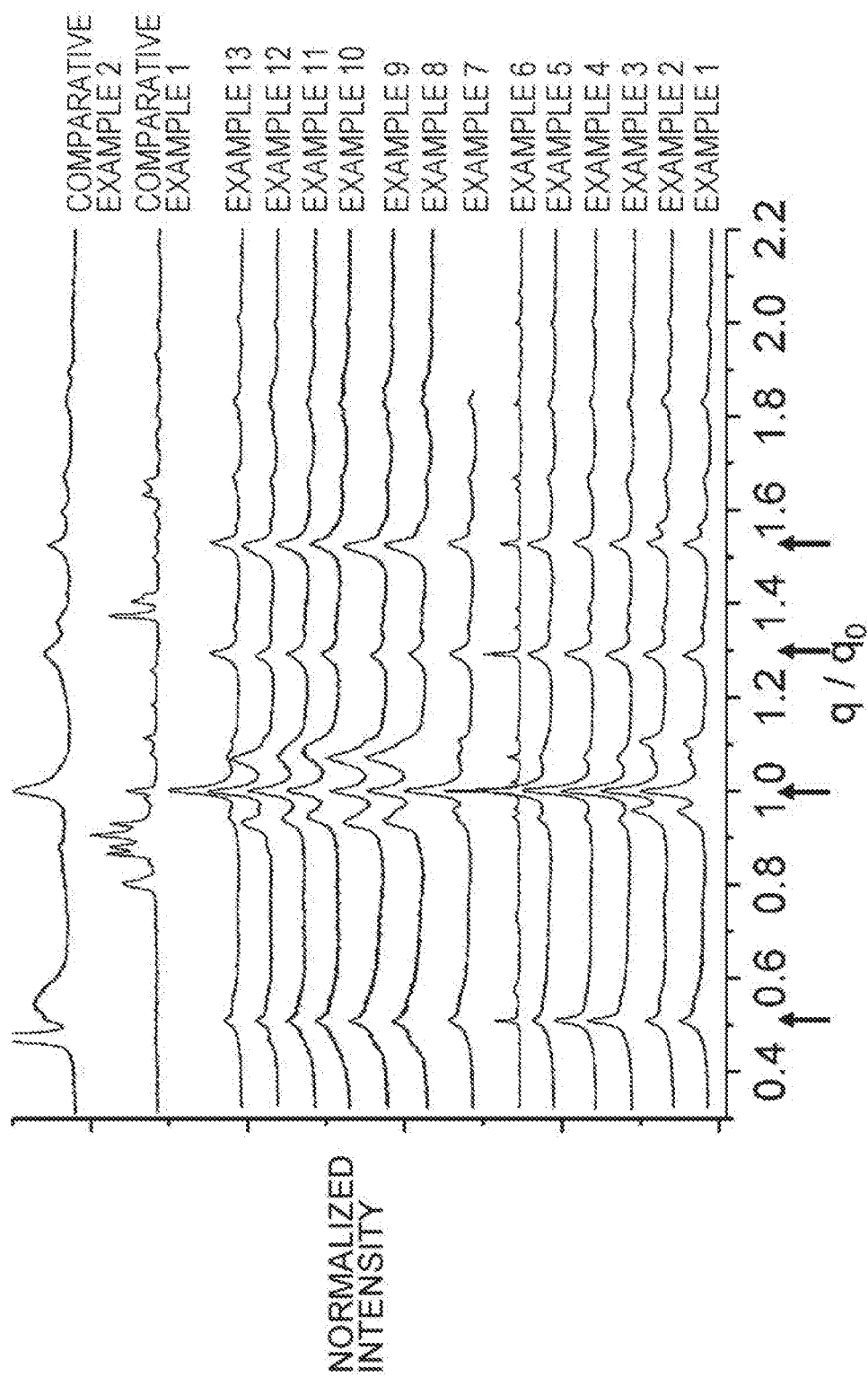
FIG. 3 illustrates conversion patterns.

FIG. 3 illustrates a diffraction pattern obtained by converting the abscissa axis 2θ of the above-described XRD diffraction pattern into $q=4\pi \sin(\theta)/\lambda$ and normalized using a value of q at the peak position 2θ=31.34°, namely, $q_0=2.201$ Å$^{-1}$, so that the abscissa axis represents $q/q_0$. In FIG. 3, peaks were observed at positions of $q/q_0=0.506$, 1.00, 1.294, and 1.527. These positions of the peaks are indicated with arrows in FIG. 3.

Evaluation of Lithium-Ion Conductivity

Figure 4:
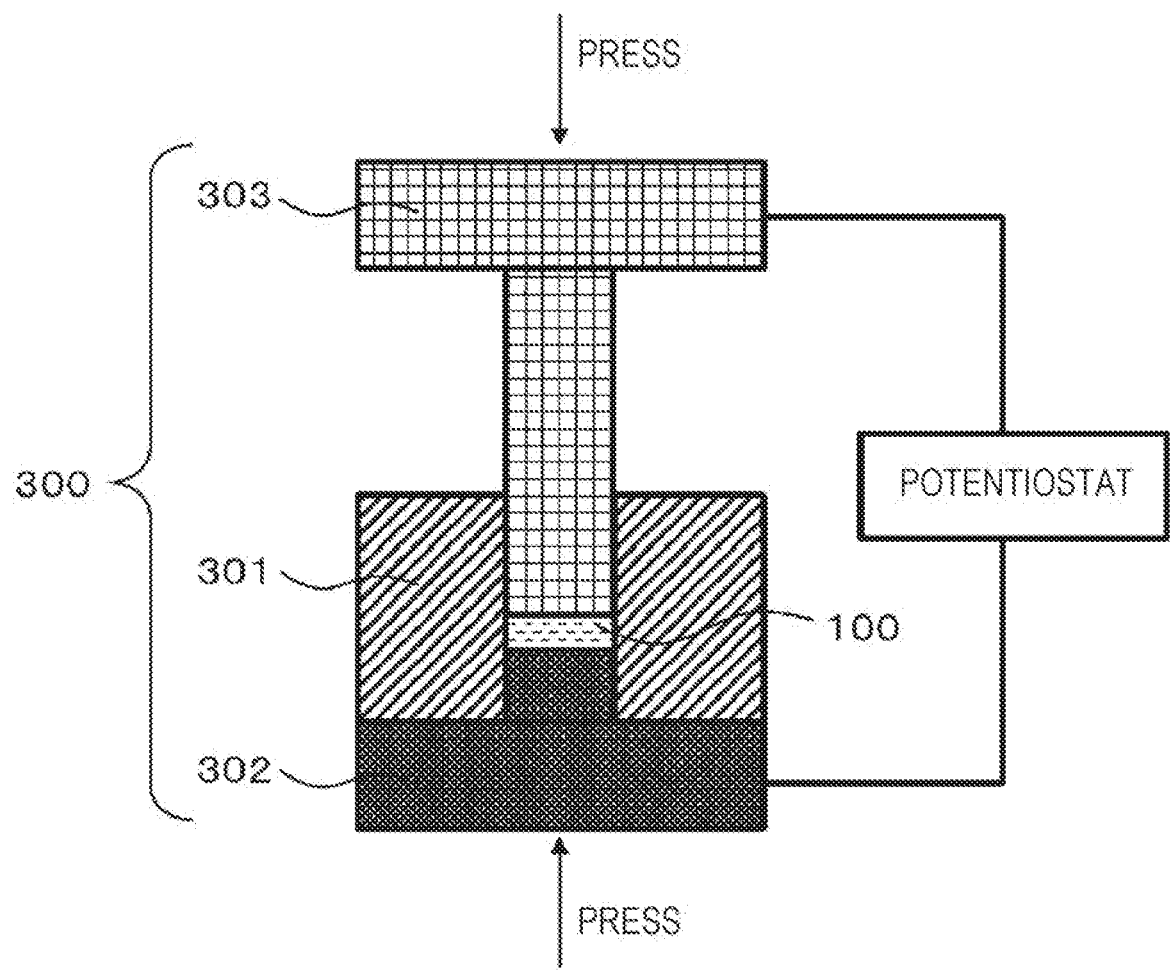
FIG. 4 is a schematic view illustrating a method of evaluating ion conductivity.

FIG. 4 is a schematic view illustrating a method of evaluating ion conductivity.

A pressing die 300 is constituted by a die 301, which is electronically insulating and composed of polycarbonate, and an upper punch 303 and a lower punch 302, which are electron conductive and composed of stainless steel.

The structure illustrated in FIG. 4 was used to evaluate ion conductivity by the following method.

In a dry atmosphere at a dew point of −30° C. or less, the powder of the solid electrolyte material of Example 1 was charged into the pressing die 300, and uniaxially pressed at 400 MPa, to prepare a conductivity measurement cell of Example 1.

In the pressed state, lead wires from the upper punch 303 and the lower punch 302 were connected to a potentiostat (VersaSTAT 4 from Princeton Applied Research) equipped with a frequency response analyzer; the electrochemical impedance measurement method was performed to measure ion conductivity at room temperature.

Figure 5:
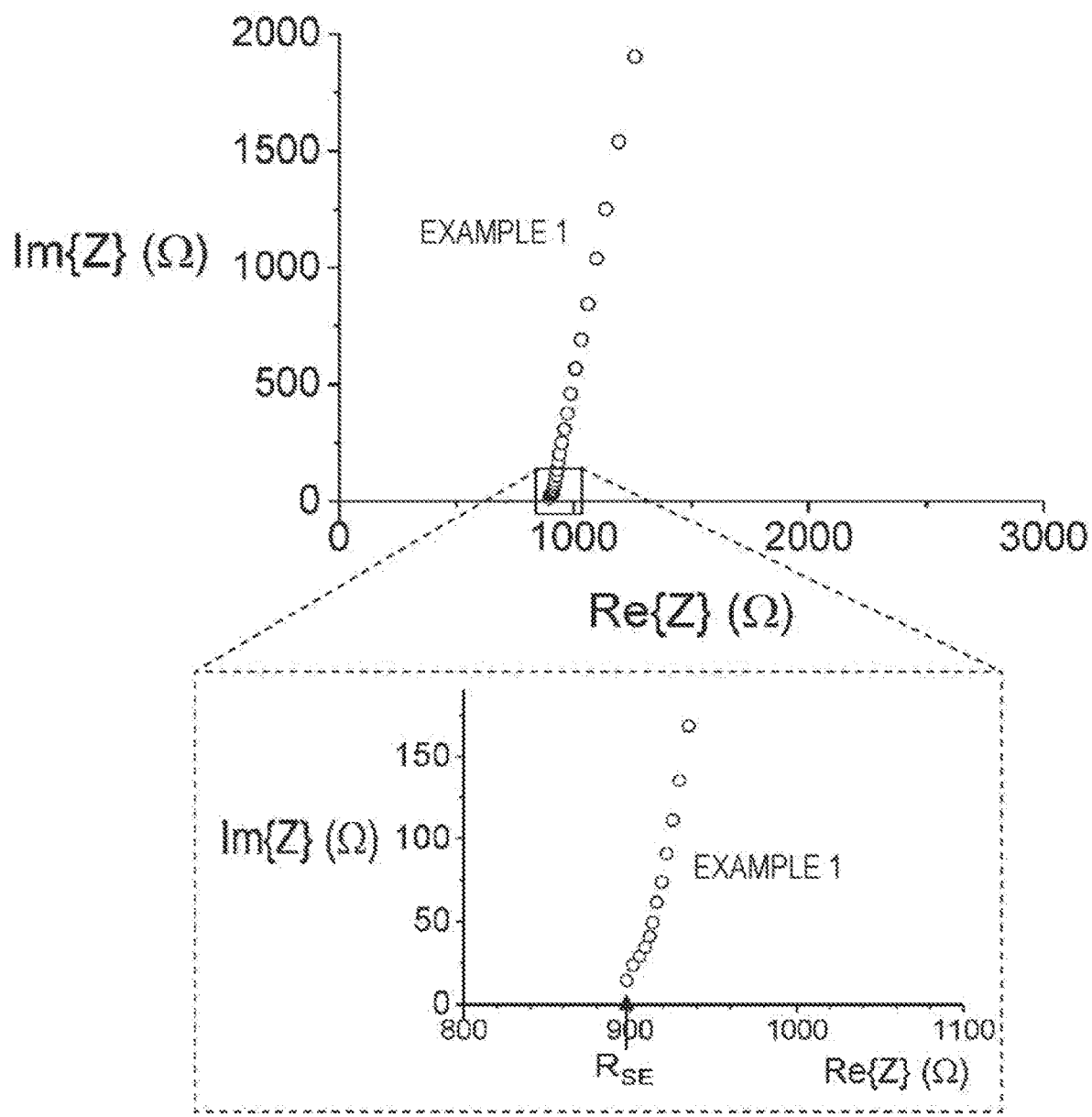
FIG. 5 is a graph illustrating evaluation results of ion conductivity provided by AC impedance measurement.

The Cole-Cole plot based on the measurement results of impedance is illustrated in FIG. 5.

In FIG. 5, at a measurement point (arrow in FIG. 5) of the minimum absolute value of the phase of complex impedance, the real part of the impedance was regarded as the resistance (to ion conduction) of the solid electrolyte of Example 1.

From the resistance of the electrolyte, ion conductivity was calculated by the following formula.

$$\sigma=(R_{SE} \times S/t)^{-1}$$

In this formula, σ represents ion conductivity; S represents the area of the electrolyte (in FIG. 4, the inner diameter of the die 301); $R_{SE}$ represents the resistance of the solid electrolyte determined by the above-described impedance measurement; and t represents the thickness of the electrolyte (in FIG. 4, the thickness of the compact of the plurality of solid electrolyte particles 100).

The solid electrolyte material of Example 1 was found to have anion conductivity at 22° C. of $2.4 \times 10^{-4}$ S/cm.

Production of Secondary Battery

In an argon glove box, the solid electrolyte material of Example 1 and $LiCoO_2$ serving as an active material were weighed in a volume ratio of 70:30. These were mixed in an agate mortar, to prepare a mixture.

In an insulating outer cylinder, the solid electrolyte material of Example 1 in an amount corresponding to a thickness of 700 μm, 8.54 mg of the above-described mixture, and 14.7 mg of Al powder were stacked in this order. This stack was pressed at a pressure of 300 MPa, to obtain a first electrode and a solid electrolyte layer.

Subsequently, metal In (thickness: 200 μm) was disposed on aside of the solid electrolyte layer opposite from a side in contact with the first electrode. This stack was pressed at a pressure of 80 MPa, to prepare a stack constituted by the first electrode, the solid electrolyte layer, and a second electrode.

Subsequently, the stack was made to be overlain by and underlain by stainless steel current collectors, and current collection leads were attached to the current collectors.

Finally, an insulating ferrule was used to isolate and seal the inside of the insulating outer cylinder from the outer atmosphere.

In this way, the secondary battery of Example 1 was produced.

Charge/Discharge Test

Figure 6:
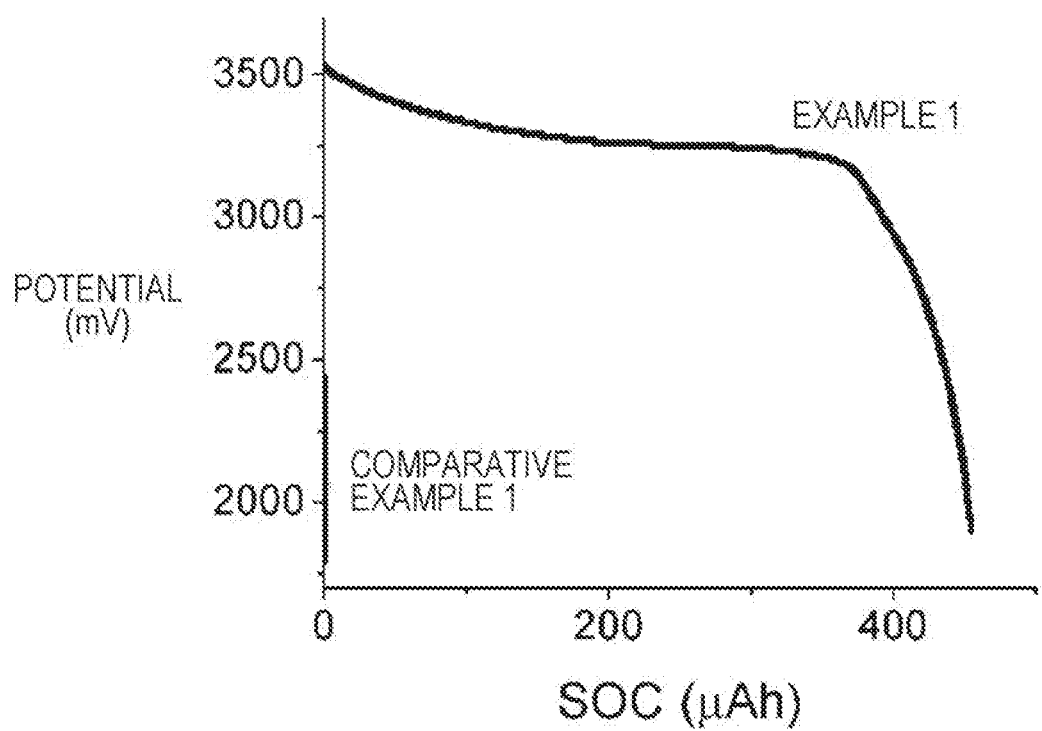
FIG. 6 is a graph illustrating initial discharge characteristics.

FIG. 6 is a graph illustrating initial discharge characteristics.

The results illustrated in FIG. 6 were provided by measurement using the following method.

The secondary battery of Example 1 was placed in a thermostatic chamber at 25° C.

The battery was subjected to constant current charging at a current corresponding to 0.05 C rate (20 hour rate) relative to the theoretical capacity of the battery. The charging was terminated at a voltage of 3.6 V.

Subsequently, discharging was performed also at a current corresponding to 0.05 C rate. The discharging was terminated at a voltage of 1.9 V.

As a result of the measurement, the initial discharge capacity of the secondary battery of Example 1 was found to be 455 µAh.

Examples 2 to 13

Hereinafter, synthesis and evaluation methods in Examples 2 to 13 will be described.

Production of Solid Electrolyte Materials

In Examples 2 to 13, within a glove box having a dry and low-oxygen-content atmosphere maintained at a dew point of −60° C. or less and an oxygen content of 5 ppm or less, raw material powders were weighed. Mixing weight ratios in Examples 2 to 13 are described later in Table 1.

In Example 6, subsequently, a heat treatment was further performed at 300° C. for 24 hours in an argon atmosphere.

Except for these, the same method as in Example 1 above was performed to produce solid electrolyte materials of Examples 2 to 13.

Analysis of Crystal Structures

The same method as in Example 1 above was performed to measure the crystal structure of each of the solid electrolyte materials of Examples 2 to 13.

The X-ray diffraction patterns of Examples 2 to 13 are illustrated in FIG. 2. The values 2θ at the peaks are described later in Table 2.

As in Example 1, the abscissa axis 2θ of such an X-ray diffraction pattern in FIG. 2 was converted into $q=4\pi \sin(\theta)/\lambda$ and further normalized using $q_0$, which is a value of q at a peak having a high intensity in the range of 2θ=30° to 33°. The resultant diffraction pattern in which the abscissa axis represents values of $q/q_0$ is illustrated in FIG. 3. The values of $q/q_0$ at peaks are described later in Table 3.

The obtained X-ray diffraction patterns of the solid electrolyte materials of Examples 2 to 13 were analyzed. As a result, Examples 2 to 13 were all found to substantially correspond to some of the peaks in the XRD diffraction pattern observed from the LYC structure or LEC structure, which is a distorted hexagonal closest packed structure. This has demonstrated that the sublattices of the anions have the same structures as in the sublattices of the anions having the LEC structure or LYC structure.

Evaluation of Lithium-Ion Conductivity

In a glove box having a dry and low-oxygen-content atmosphere maintained at a dew point of −90° C. or less and an oxygen content of 5 ppm or less, the same method as in Example 1 above was performed to prepare conductivity measurement cells of Examples 2 to 13.

Except for this, the same method as in Example 1 above was performed to measure ion conductivity.

Such ion conductivities of Examples 2 to 13 are described later in Table 2 and Table 3.

Production of Secondary Batteries

In a glove box having a dry and low-oxygen-content atmosphere maintained at a dew point of −90° C. or less and an oxygen content of 5 ppm or less, each of the solid electrolyte materials of Examples 2 to 13 and $LiCoO_2$ serving as a positive electrode active material were weighed in a volume ratio of 30:70. These were mixed in an agate mortar. Thus, positive electrode mixtures of Examples 2 to 13 were prepared.

Except for these, the same method as in Example 1 above was performed to produce secondary batteries of Examples 2 to 13.

Charge/Discharge Test

The same method as in Example 1 above was performed to subject the secondary batteries of Examples 2 to 13 to the charge/discharge test. The initial discharge characteristics of Examples 2 to 13 were similar to those of Example 1, and good charge/discharge characteristics were obtained.

Comparative Example 1

As raw material powders for the solid electrolyte, 409.3 mg of LiCl, 547.3 mg of $YCl_3$, and 49.4 mg of $SrCl_2$ were mixed, then subjected to milling processing using a planetary ball mill for 13 hours at 600 rpm, dissolved in an acetonitrile solvent, and then heated at 100° C. to precipitate again.

Except for this, the same methods as in Example 1 above were performed to carry out synthesis, evaluation, and analysis.

The ion conductivity measured at 22° C. was found to be lower than $1 \times 10^{-8}$ S/cm.

In the X-ray diffraction pattern, a peak having a relatively high intensity was observed at 2θ=32.34° in the range of 2θ=30° to 33°; however, peaks having high intensities were not observed in the ranges of 2θ=15° to 18θ, 39° to 43°, and 47° to 51°; peaks were observed in different ranges of 2θ such as 27.8° to 30°, 44.49°, and 54.06°.

In an X-ray diffraction pattern in which the abscissa axis represents values of $q/q_0$ where a value of q at a peak observed at 2θ=32.34° is defined as $q_0$, peaks having high intensities were not observed in the ranges of $q/q_0$=0.50 to 0.52, 1.28 to 1.30, and 1.51 to 1.54.

Comparative Example 2

As the raw material powders for the solid electrolyte, 63.0 mg of LiCl and 937.0 mg of $NbCl_5$ were mixed.

Except for this, the same methods as in Example 1 above were performed to carry out synthesis, evaluation, and analysis.

The ion conductivity measured at 22° C. was found to be $1 \times 10^{-7}$ S/cm.

The X-ray diffraction pattern is illustrated in FIG. 2. The values of 2θ at the peaks are described later in Table 2.

As in Example 1, the abscissa axis 2θ was converted into $q=4\pi \sin(\theta)/\lambda$, and further normalized using $q_0$, which is a value of q at a peak at the lower angle out of two peaks having high intensities in the range of 2θ=25° to 35°. The resultant diffraction pattern in which the abscissa axis represents values of $q/q_0$ is illustrated in FIG. 3. The values of $q/q_0$ at peaks are described later in Table 3.

The X-ray diffraction pattern was analyzed and found that the sublattices of the anions of Comparative Example 2 have a hexagonal closest packed structure.

The compositions and evaluation results of Examples 1 to 13 and Comparative Examples 1 and 2 are described in Tables 1 to 3.

TABLE 1

| | Constituent elements | | | Li source | | Y source | | M source | |
|---|---|---|---|---|---|---|---|---|---|
| | Li, Y | M | X | Chemical formula | Mixing ratio | Chemical formula | Mixing ratio | Chemical formula | Mixing ratio |
| Example 1 | Li, Y | Sr | Cl | LiCl | 0.407 | $YCl_3$ | 0.544 | $SrCl_2$ | 0.049 |
| Example 2 | Li, Y | Sr | Cl | LiCl | 0.432 | $YCl_3$ | 0.422 | $SrCl_2$ | 0.147 |
| Example 3 | Li, Y | Zr | Cl | LiCl | 0.330 | $YCl_3$ | 0.306 | $ZrCl_4$ | 0.364 |
| Example 4 | Li, Y | Zr | Cl | LiCl | 0.279 | $YCl_3$ | 0.329 | $ZrCl_4$ | 0.392 |
| Example 5 | Li, Y | Ca | Cl | LiCl | 0.365 | $YCl_3$ | 0.601 | $CaCl_2$ | 0.034 |
| Example 6 | Li, Y | Ca | Cl | LiCl | 0.365 | $YCl_3$ | 0.601 | $CaCl_2$ | 0.034 |
| Example 7 | Li, Y | Al | Cl | LiCl | 0.402 | $YCl_3$ | 0.556 | $AlCl_3$ | 0.042 |
| Example 8 | Li, Y | Mg | Cl | LiCl | 0.415 | $YCl_3$ | 0.555 | $MgCl_2$ | 0.030 |
| Example 9 | Li, Y | Zn | Cl | LiCl | 0.410 | $YCl_3$ | 0.548 | $ZnCl_2$ | 0.043 |
| Example 10 | Li, Y | Ta | Cl | LiCl | 0.359 | $YCl_3$ | 0.532 | $TaCl_5$ | 0.108 |
| Example 11 | Li, Y | Nb | Cl | LiCl | 0.301 | $YCl_3$ | 0.576 | $NbCl_5$ | 0.042 |
| Example 12 | Li, Y | Ca | Cl, Br | LiCl LiBr | 0.245 0.239 | $YCl_3$ | 0.485 | $CaCl_2$ | 0.031 |
| Example 13 | Li, Y | Ca | Cl, I | LiCl LiI | 0.217 0.327 | $YCl_3$ | 0.429 | $CaCl_2$ | 0.027 |
| Comparative Example 1 | Li, Y | Sr | Cl | LiCl | 0.065 | $YCl_3$ | 0.694 | $SrCl_2$ | 0.241 |
| Comparative Example 2 | Li | Nb | Cl | LiCl | 0.063 | N/A | | $NbCl_5$ | 0.937 |

TABLE 2

| | Li, Y | M | X | Conductivity (S/cm) | XRD peak positions (2θ, deg) | | | |
|---|---|---|---|---|---|---|---|---|
| Example 1 | Li, Y | Sr | Cl | 2.4E−04 | 15.72 | 31.34 | 40.9 | 48.72 |
| Example 2 | Li, Y | Sr | Cl | 1.1E−04 | 15.78 | 31.34 | 40.88 | 48.68 |
| Example 3 | Li, Y | Zr | Cl | 1.5E−03 | 15.6 | 31 | 40.3 | 48.1 |
| Example 4 | Li, Y | Zr | Cl | 1.0E−03 | 15.78 | 31.32 | 40.74 | 48.74 |
| Example 5 | Li, Y | Ca | Cl | 5.2E−04 | 15.78 | 31.3 | 40.8 | 48.74 |
| Example 6 | Li, Y | Ca | Cl | 1.3E−04 | 15.94 | 31.64 | 41.22 | 49.24 |
| Example 7 | Li, Y | Al | Cl | 5.0E−04 | 15.92 | 31.58 | 41.16 | 49.22 |
| Example 8 | Li, Y | Mg | Cl | 2.8E−04 | 15.76 | 31.3 | 40.78 | 48.62 |
| Example 9 | Li, Y | Zn | Cl | 2.8E−04 | 15.76 | 31.26 | 40.74 | 48.62 |
| Example 10 | Li, Y | Ta | Cl | 5.0E−04 | 15.78 | 31.26 | 40.76 | 48.68 |
| Example 11 | Li, Y | Nb | Cl | 5.0E−04 | 15.82 | 31.32 | 40.88 | 48.74 |
| Example 12 | Li, Y | Ca | Cl, Br | 9.2E−04 | 15.60 | 31.00 | 40.22 | 48.10 |
| Example 13 | Li, Y | Ca | Cl, I | 8.5E−04 | 15.60 | 30.95 | 40.37 | 48.23 |
| Comparative Example 1 | Li, Y | Sr | Cl | <1e−8 | — | 32.34 | 44.94 | 54.06 |
| Comparative Example 2 | Li | Nb | Cl | 1.0E−07 | 15.24 | 32.5 | 42.42 | 50.5 |

TABLE 3

| | Li, Y | M | X | Conductivity (S/cm) | XRD peak positions ($q/q_0$) | | | |
|---|---|---|---|---|---|---|---|---|
| Example 1 | Li, Y | Sr | Cl | 2.4E−04 | 0.506 | 1.000 | 1.294 | 1.527 |
| Example 2 | Li, Y | Sr | Cl | 1.1E−04 | 0.508 | 1.000 | 1.293 | 1.526 |
| Example 3 | Li, Y | Zr | Cl | 1.5E−03 | 0.508 | 1.000 | 1.289 | 1.525 |
| Example 4 | Li, Y | Zr | Cl | 1.0E−03 | 0.509 | 1.000 | 1.290 | 1.529 |
| Example 5 | Li, Y | Ca | Cl | 5.2E−04 | 0.509 | 1.000 | 1.292 | 1.530 |
| Example 6 | Li, Y | Ca | Cl | 1.3E−04 | 0.509 | 1.000 | 1.291 | 1.528 |
| Example 7 | Li, Y | Al | Cl | 5.0E−04 | 0.509 | 1.000 | 1.292 | 1.530 |
| Example 8 | Li, Y | Mg | Cl | 2.8E−04 | 0.508 | 1.000 | 1.292 | 1.526 |
| Example 9 | Li, Y | Zn | Cl | 2.8E−04 | 0.509 | 1.000 | 1.292 | 1.528 |
| Example 10 | Li, Y | Ta | Cl | 5.0E−04 | 0.510 | 1.000 | 1.293 | 1.530 |
| Example 11 | Li, Y | Nb | Cl | 5.0E−04 | 0.510 | 1.000 | 1.294 | 1.529 |
| Example 12 | Li, Y | Ca | Cl, Br | 9.2E−04 | 0.508 | 1.000 | 1.289 | 1.525 |
| Example 13 | Li, Y | Ca | Cl, I | 8.5E−04 | 0.509 | 1.000 | 1.294 | 1.531 |

TABLE 3-continued

| | Li, Y | M | X | Conductivity (S/cm) | XRD peak positions (q/q$_0$) | | | |
|---|---|---|---|---|---|---|---|---|
| Comparative Example 1 | Li, Y | Sr | Cl | <1e−8 | — | 1.000 | 1.372 | 1.632 |
| Comparative Example 2 | Li | | Nb | Cl | 1.0E−07 | 0.474 | 1.000 | 1.293 | 1.524 |

Discussion

Examples 1 to 13 have been found to exhibit high ion conductivities of $1\times10^{-4}$ S/cm or more at or about room temperature, compared with Comparative Examples 1 and 2.

Examples 1 and 2 and Comparative Example 1 are compared: in spite of the same constituent elements of Li, Y, Sr, and Cl, the X-ray diffraction patterns of Examples 1 and 2 have peaks observed in the ranges of 2θ=15° to 18°, 30° to 33°, 39° to 43°, and 47° to 51°, whereas, in Comparative Example 1, peaks having high intensities are not observed in these ranges except for 30° to 33°, but peaks having high intensities are observed outside of the above-described ranges. Thus, there is a difference between the crystal structures. The difference between the crystal structures is more evident in diffraction patterns in Table 3 or FIG. 3 in which the abscissa axes represent normalized scattering vector q/q$_0$. Specifically, in Examples 1 and 2, with reference to the value of q$_0$ at the peak in the range of 30° to 33°, peaks are observed at positions of q/q$_0$=0.51, 1.00, 1.13, and 1.53, whereas, in Comparative Example 1, peaks are observed at totally different positions. Thus, there is a difference between the crystal structures.

On the other hand, Examples 1 to 13 and Comparative Example 2 are compared: diffraction peaks are observed at similar positions, which indicate that the crystal structures are similar crystal structures; however, the constituent elements are different.

Compared with Li$_3$YCl$_6$ of NPL 1 and Li$_3$YBr$_6$ of NPL 2 in which ion conduction at room temperature is not observed, Examples 1 to 13 exhibit markedly high conductivities.

Thus, when a solid electrolyte material is composed of constituent elements of Li, Y, M, and X where M is one or two or more elements selected from the group consisting of Mg, Ca, Sr, Ba, Zn, Zr, Nb, and Ta, and X is one or two or more elements selected from the group consisting of C, Br, and I, and is measured using Cu—Kα radiation (wavelength: 1.5405 Å and 1.5444 Å) as the X-ray by the θ-2θ method to measure X-ray diffraction having sufficient intensities in which peaks having relatively high intensities are observed in the ranges of diffraction angles 2θ of 15° to 18°, 30° to 33°, 39° to 43°, and 47° to 51°, the electrolyte material exhibits a high ion conductivity of $1\times10^{-4}$ S/cm or more.

In the X-ray diffraction pattern of a solid electrolyte material, when the values of 2θ generally used for the abscissa axis are converted into a scattering vector defined as $q=4\pi \sin(\theta)/\lambda$, a diffraction pattern is drawn such that the abscissa axis represents normalized q/q$_0$ where q$_0$ corresponds to a peak in the range of q=2.109 Å$^{-1}$ to 2.315 Å$^{-1}$, and peaks are observed in the ranges of q/q$_0$ of 0.50 to 0.52, 1.28 to 1.30, and 1.51 to 1.54, the solid electrolyte material exhibits a high ion conductivity of $1\times10^{-4}$ S/cm or more.

In each of Examples 1 to 13, the battery exhibited charge/discharge operations at room temperature. On the other hand, in Comparative Examples 1 and 2, discharge capacity was not substantially detected, and operations of the batteries were not confirmed. In addition, the materials for Examples 1 to 13 do not include sulfur as a constituent element, so that generation of hydrogen sulfide does not occur.

Thus, it has been demonstrated that the solid electrolyte material according to the present disclosure is an electrolyte material that does not generate hydrogen sulfide, exhibits a high lithium-ion conductivity, and provides good charge/discharge operations.

What is claimed is:

1. A solid electrolyte material comprising:
    Li;
    Y;
    at least one selected from the group consisting of Mg, Ca, Sr, Ba, Zn, Zr, Nb, and Ta; and
    at least one selected from the group consisting of Cl, Br, and I,
    wherein an X-ray diffraction pattern of the solid electrolyte material obtained using Cu—Kα radiation as an X-ray source includes peaks in a range of diffraction angles 2θ of 30° or more and 33° or less, in a range of diffraction angles 2θ of 39° or more and 43° or less, and in a range of diffraction angles 2θ of 47° or more and 51° or less.

2. The solid electrolyte material according to claim 1, wherein the X-ray diffraction pattern further includes a peak in a range of diffraction angles 2θ of 15° or more and 18° or less.

3. The solid electrolyte material according to claim 1, wherein
    the solid electrolyte material contains a sublattice of the at least one selected from the group consisting of Cl, Br, and I, and
    the sublattice has a hexagonal closest packed structure or a distorted hexagonal closest packed structure.

4. A battery comprising:
    the solid electrolyte material according to claim 1;
    a positive electrode;
    a negative electrode; and
    an electrolyte layer disposed between the positive electrode and the negative electrode,
    wherein at least one selected from the group consisting of the positive electrode, the negative electrode, and the electrolyte layer contains the solid electrolyte material.

5. A solid electrolyte material comprising:
Li;
Y;
at least one selected from the group consisting of Mg, Ca, Sr, Ba, Zn, Zr, Nb, and Ta; and
at least one selected from the group consisting of Cl, Br, and I, wherein
a first converted pattern, which is obtained by measuring an X-ray diffraction pattern of the solid electrolyte material by using Cu—Kα radiation as an X-ray source and converting the X-ray diffraction pattern such that a horizontal axis represents q instead of diffraction angle 2θ,
includes a reference peak in a range of q of 2.109 Å$^{-1}$ or more and 2.315 Å$^{-1}$ or less,
$q=4\pi \sin \theta/\lambda$ where $\lambda$ is a wavelength of the Cu—Kα radiation,
a second converted pattern, which is obtained by converting the X-ray diffraction pattern such that the horizontal axis represents $q/q_0$ instead of diffraction angle 2θ,
includes peaks in a range of $q/q_0$ of 1.28 or more and 1.30 or less and in a range of $q/q_0$ of 1.51 or more and 1.54 or less, and
$q_0$ is a value of q corresponding to the reference peak in the first conversion pattern.

6. The solid electrolyte material according to claim 5, wherein the second conversion pattern includes a peak in a range of $q/q_0$ of 0.50 or more and 0.52 or less.

7. The solid electrolyte material according to claim 5, wherein
the solid electrolyte material contains a sublattice of the at least one selected from the group consisting of Cl, Br, and I, and
the sublattice has a hexagonal closest packed structure or a distorted hexagonal closest packed structure.

8. A battery comprising:
the solid electrolyte material according to claim 5;
a positive electrode;
a negative electrode; and
an electrolyte layer disposed between the positive electrode and the negative electrode,
wherein at least one selected from the group consisting of the positive electrode, the negative electrode, and the electrolyte layer contains the solid electrolyte material.

* * * * *